(12) United States Patent
Dowlatkhah et al.

(10) Patent No.: US 10,223,385 B2
(45) Date of Patent: Mar. 5, 2019

(54) SYSTEMS, METHODS, AND COMPUTER STORAGE DEVICES FOR PROVIDING THIRD PARTY APPLICATION SERVICE PROVIDERS WITH ACCESS TO SUBSCRIBER INFORMATION

(71) Applicant: AT&T Intellectual Property I, L.P., Atlanta, GA (US)

(72) Inventors: Sangar Dowlatkhah, Alpharetta, GA (US); Reuben Klein, East Brunswick, NJ (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1189 days.

(21) Appl. No.: 14/134,126

(22) Filed: Dec. 19, 2013

(65) Prior Publication Data
US 2015/0178324 A1 Jun. 25, 2015

(51) Int. Cl.
*G06F 17/30* (2006.01)
*H04W 8/20* (2009.01)

(52) U.S. Cl.
CPC .. *G06F 17/30289* (2013.01); *G06F 17/30575* (2013.01); *H04W 8/20* (2013.01)

(58) Field of Classification Search
CPC ................................................ G06F 17/30289
See application file for complete search history.

(56) References Cited

U.S. PATENT DOCUMENTS

| | | | |
|---|---|---|---|
| 6,260,120 B1 | 7/2001 | Blumenau et al. | |
| 6,366,987 B1 | 4/2002 | Tzelnic et al. | |
| 6,505,241 B2 | 1/2003 | Pitts | |
| 6,574,661 B1 | 6/2003 | Delano et al. | |
| 6,598,167 B2 | 7/2003 | Devine et al. | |
| 7,225,249 B1 | 5/2007 | Barry et al. | |
| 7,577,640 B1 * | 8/2009 | Bland | G06F 17/30575 |
| 8,073,777 B2 | 12/2011 | Barry et al. | |
| 8,234,377 B2 | 7/2012 | Cohn | |
| 8,239,632 B2 | 8/2012 | Dowlatkhah | |
| 8,495,724 B2 | 7/2013 | Devine et al. | |
| 8,504,070 B2 | 8/2013 | Dowlatkhah | |
| 8,788,628 B1 * | 7/2014 | Taylor | G06F 17/30194 |
| | | | 709/219 |
| 9,740,757 B1 * | 8/2017 | Gilder | G06F 17/30563 |
| 2002/0099728 A1 * | 7/2002 | Lees | G06F 17/30351 |
| 2002/0191590 A1 | 12/2002 | Niu et al. | |
| 2003/0149709 A1 * | 8/2003 | Banks | G06F 17/30578 |

(Continued)

*Primary Examiner* — Brittany N Allen
(74) *Attorney, Agent, or Firm* — Hartman & Citrin LLC

(57) ABSTRACT

A service-related repository provides access to subscriber information to third party application service providers without providing the third party application service providers with access to a main network repository. The service-related repository stores subscriber information in a standardized format and in a format tailored for each third party application service provider. The subscriber information stored within the service-related repository mirrors network subscriber information stored within the main network repository. The main network repository is distinct from a secondary repository that includes the service-related repository. The secondary repository also includes a subscriber-related repository for storing the subscriber information in a standardized format.

13 Claims, 3 Drawing Sheets

(56) References Cited

U.S. PATENT DOCUMENTS

| | | | |
|---|---|---|---|
| 2003/0208588 A1* | 11/2003 | Segal | G06Q 30/02 709/224 |
| 2005/0155075 A1* | 7/2005 | Crichton | H04L 12/1859 725/105 |
| 2008/0270164 A1 | 10/2008 | Kidder et al. | |
| 2009/0070237 A1* | 3/2009 | Lew | G06Q 10/087 705/28 |
| 2009/0193057 A1* | 7/2009 | Maes | H04L 67/306 |
| 2010/0235467 A1 | 9/2010 | Dowlatkhah | |
| 2010/0235585 A1* | 9/2010 | Dowlatkhah | G06F 17/30566 711/136 |
| 2012/0124140 A1 | 5/2012 | Bhatt et al. | |
| 2012/0238292 A1 | 9/2012 | Walker et al. | |
| 2012/0290795 A1 | 11/2012 | Dowlatkhah | |
| 2013/0067017 A1* | 3/2013 | Carriere | G06Q 10/06 709/208 |
| 2013/0159365 A1* | 6/2013 | Boctor | G06F 8/71 707/827 |
| 2013/0197910 A1 | 8/2013 | Dowlatkhah | |

\* cited by examiner

SYSTEMS, METHODS, AND COMPUTER STORAGE DEVICES FOR PROVIDING THIRD PARTY APPLICATION SERVICE PROVIDERS WITH ACCESS TO SUBSCRIBER INFORMATION

TECHNICAL FIELD

The present disclosure relates generally to telecommunications, and, more particularly, to providing access to subscriber information for third party application service providers.

BACKGROUND

In a carrier network, there are core-network-related databases and service-related databases. Each of the databases includes subscriber information. Subscriber information includes, for example, a set of parameters for each subscriber, such as information identifying the subscriber, information indicating services the subscriber is authorized to use, etc. The subscriber information may be common across the different databases.

Core-network-related databases include subscriber information and network related information and are used to operate a carrier network. Service related-databases are used by a service provider to perform services.

A current network architecture includes a consolidated network repository (CNR) that includes core-network-related databases. The current network architecture also includes independent data repositories that include service-related databases. Each of the independent service-related data repositories is associated with a service provider, a carrier, a device supplier, or another entity, such as a social network partner.

Generally, for each subscriber, certain parameters that are common to subscriber information in a core-network-related database and information in a service-related database should be the same. Similarly, certain parameters that are common to subscriber information in one service-related database and subscriber information in another service-related database should be the same. Having the certain parameters be the same parameters in all of the databases facilitates operation of the carrier network.

Managing the information stored in the core-network-related database and the service-related databases in the current network architecture is difficult and cumbersome. One reason for the difficulty in managing the subscriber information is that each service-related database has a data schema that is typically tailored to a third party service provider or application of the service provider. The CNR and the independent data repositories are separately provisioned and maintained, which is cumbersome and inefficient.

In addition, use of subscriber information in the current network architecture is restrictive. The CNR has rules and policies that limit access to the core-network-related databases in the CNR for individual data items, enforcing rules for third party access to subscriber information. The rules and policies restrict access to the core-network-related databases in the CNR for a number of reasons, including maintaining the security and reliability of the core-network-related databases to keep the carrier network operating smoothly.

Also, third party service providers and other entities utilize a set of policies to access the content of the service-related databases. Managing these policies and access to the individual service-related databases is extremely complex.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a system provides third party application service providers with access to subscriber information associated with subscribers of a core network. The system includes a service-related repository associated with a plurality of third party application service providers. The service-related repository stores subscriber information associated with subscribers served by a communication network in a standardized format and in a format tailored for each of the plurality of third party application service providers. The subscriber information stored within the service-related repository mirrors network subscriber information stored within a network repository that is associated with the communication network and is distinct from the system. The system also includes a processor and a memory. The memory has instructions stored thereon which, when executed by the processor, cause the processor to perform operations. The operations comprise receiving a request for subscriber information associated with a subscriber from a third party application service provider among the plurality of third party application service providers and providing the third party application service provider with access to the subscriber information associated with the subscriber without providing the third party application service provider with access to the network repository.

According to another illustrative embodiment, a method provides third party application service providers with access to subscriber information associated with subscribers of a core network. The method comprises receiving a request for subscriber information associated with a subscriber from a third party application service provider. The method further comprises providing the third party application service provider with access to the subscriber information associated with the subscriber stored within a service-related repository included within a secondary repository. The service-related repository stores subscriber information associated with subscribers served by a communication network in a standardized format and in a format tailored for each of a plurality of third party application service providers. The subscriber information stored within the service-related repository mirrors network subscriber information stored within a main network repository that is associated with the communication network and is distinct from the secondary repository.

According to another illustrative embodiment, a computer readable storage device provides third party application service providers with access to subscriber information associated with subscribers of a core network. The computer readable medium has instructions stored thereon which, when executed by a processor, cause the processor to perform operations. The operations include receiving a request for subscriber information associated with a subscriber from a third party application service provider. The operations further include providing the third party application service provider with access to the subscriber information associated with the subscriber stored within a service-related repository included within a secondary repository. The service-related repository stores subscriber information associated with subscribers served by a communication network in a standardized format and in a format tailored for each of a plurality of third party application service providers. The subscriber information stored within the service-related repository mirrors network subscriber information stored within a main network repository that is associated with the communication network and is distinct from the secondary repository.

DETAILED DESCRIPTION

Figure 1:
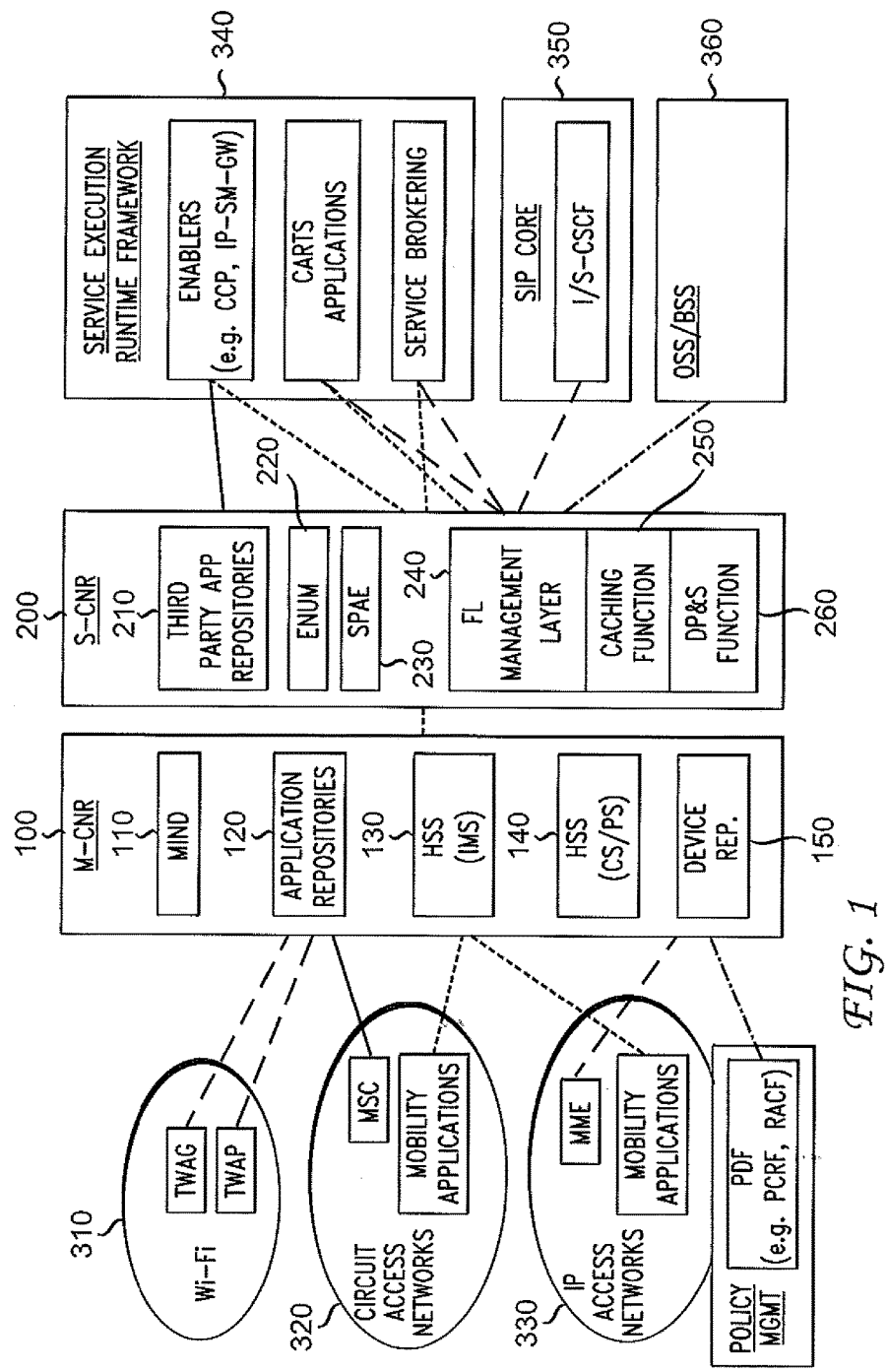
FIG. 1 illustrates a network architecture in which a shadow consolidated network repository may be implemented according to an illustrative embodiment.

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in this application, the terms "component," "system," "interface," and the like are intended to refer to a computer-related entity or an entity related to an operational apparatus with one or more specific functionalities, wherein the entity can be either hardware, a combination of hardware and software, software, or software in execution. One or more of such entities are also referred to as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, interface, and the like.

According to an illustrative embodiment, a network architecture includes a main consolidated network repository (M-CNR) that includes core-network-related databases and a shadow CNR (S-CNR) that includes service-related databases. The S-CNR mirrors subscriber information that is stored in the M-CNR and facilitates implementation of new services and network integration and expansion.

The S-CNR, also referred to herein as a secondary CNR, stores subscriber information remotely from the M-CNR. The S-CNR makes the subscriber information accessible to third party application service providers while keeping the subscriber information within the M-CNR secure. For the purposes of this description, the terminology "third party application service providers" includes entities other than the native carrier supporting the M-CNR that provide services to subscribers of the carrier, such as other carriers, service providers, device suppliers, social networking partners, etc. The S-CNR brings all the service databases together in one place, which facilitates synching or updating parameters that are common to subscriber information across different service and service providers in one service-related database and storing subscriber information in another service-related database. In other words, the S-CNR allows the independent data repositories previously used for third party application service providers to be commonly provisioned and maintained in a common database. As such, the S-CNR maintains the integrity of service-related databases and limits the increasing number of service-related databases.

The S-CNR acts as a buffer between the M-CNR and the third party application service providers such that service providers, carriers, device suppliers, and social networking partners have access to copied subscriber data that mirrors subscriber data in core-network-related databases. Still, the CNR rules and policies that limit access to the core-network-related databases in the M-CNR remain in place. For example, the rules and policies limit access to the core-network-related databases in the M-CNR, such that the core-network-related databases are not able to be modified in real time by third party service providers and are only able to be modified by the S-CNR according to a caching function application and a dynamic security and policy function application. The S-CNR strengthens the security of subscriber data of core-network-related databases by limiting outside parties access to sensitive information that can interfere with real-time access to core-network-related databases by networks. At the same time, the S-CNR makes subscriber data of core-network-related databases available.

In addition, the S-CNR simplifies the implementation of new services and facilitates the integration of new databases of new networks to the M-CNR in a streamlined fashion. For example, when a carrier acquires a new network, the new network's databases can be housed in the S-CNR before integration into the main CNR.

FIG. 1 illustrates a network architecture in which a S-CNR may be implemented according to an illustrative embodiment. Referring to FIG. 1, a M-CNR 100 is in communication with a S-CNR 200 via a connection using, e.g., the SIP protocol.

The M-CNR 100 includes core-network-related databases (i.e., master databases) of subscriber information that is used to operate a carrier (core) network. For this reason, the M-CNR 100 has restrictive policies regarding how the subscriber information stored in the core-network-related databases can be accessed and modified.

According to an illustrative embodiment, the S-CNR 200 is structured similar to the M-CNR 100 in that the subscriber information stored in the service-related database is based on the subscriber information in the core-network-related databases of the M-CNR 100. However, the S-CNR 200 has less restrictive policies regarding how the subscriber information in the service-related database is accessed and modified. For example, the S-CNR 200 includes open application programming interfaces (APIs) to allow access to the subscriber information in the service-related database. The APIs may be applications that are stored within a memory of the S-CNR 200 as described in further detail below with reference to FIG. 2.

Now to describe the architecture shown in FIG. 1 in more detail, the illustrated M-CNR 100 includes core-network-related databases that support communication networks, such as Wi-Fi networks 310, circuit-switched access networks 320, IP access networks 330, and the like. The M-CNR 100 consolidates subscriber data across the Wi-Fi networks 310, the circuit access networks 320, and the IP access networks 330. It should be appreciated that the networks 310, 320, and 330 are provided as illustrative examples. The M-CNR 100 may include core-network-related databases that support substantially any wireless communication network (second-generation (2G), third-generation (3G), or fourth-generation (4G) network and variations thereof) and non-wireless communication network (broadband network, a cable network, a conventional Public Switched Telephone Network (PSTN), etc.). Examples of radio technologies or wireless networks, in addition to Wi-Fi, include Femto cell technology, Worldwide Interoperability for Microwave Access (WiMAX), Enhanced General Packet Radio Service (Enhanced GPRS), Third Generation Partnership Project (3GPP) Long Term Evolution (LTE), 3GPP Universal Mobile Telecommunications System (UMTS), Third Generation Partnership Project 2 (3GPP2) Ultra Mobile Broadband (UMB), High Speed Packet Access (HSPA); High Speed Downlink Packet Access (HSDPA), High Speed Uplink Packet Access (HSDPA); Global System for Mobile Communication (GSM) Enhanced Data Rate for GSM Evolution (EDGE) RAN or GERAN, UMTS Terrestrial Radio Access Network (UTRAN); or LTE Advanced. Examples of wireline technology include fiber-optic backbone networks, digital subscriber line (DSL) networks, T1/E1-based networks, Ethernet backbone networks, etc. Aspects of the subject disclosure also can be advantageously exploited in legacy telecommunication technologies.

The illustrated core-network-related databases of the M-CNR 100 include databases for storing subscriber information for the Wi-Fi network 310, the circuit access networks 320, and the IP Access Networks 330. These databases include a Master Integrated Network Directory (MIND) 110, a Home Subscriber Server (HSS) for IP Multimedia Subsystem (IMS) entities 130, and a HSS for circuit switched (CS) and packet switched (PS) entities 140. The M-CNR 100 also includes application repositories 120 and device repositories 150

The MIND 110, the HSS (IMS) 130, and the HSS (CS/PS) 140 store subscriber information, such as subscriber profiles, as well as subscription information. These databases may also be used for authentication and authorization of a user and/or a device and can provide information about the subscriber's location and IP information.

The device repositories 150 store information regarding various devices that are supported by the core network associated with the M-CNR 100. The application repositories 120 store information regarding various applications that are supported by the core network associated with the M-CNR 100.

The M-CNR 100 includes an interface (not shown) that functionally connects the M-CNR 100 to the Wi-Fi networks 310, the circuit access networks 320, and the IP access networks 330.

The Wi-Fi networks 310 may include, e.g., a Trusted Wireless Access Gateway (TWAG) and a Trusted WLAN AAA Proxy (TWAP). The circuit access networks 320 may include network components, such as a Mobile Switching Center (MSC), and mobility applications. The IP access networks 330 may include network components, such as a Mobile Management Entity (MME), and mobility applications. In addition, the IP access networks 330 may include a policy management component, e.g., a policy decision function (PDF), such as a Policy and Charging Rules Function (PCRF) and a Resource and Access Control Facility (RACF).

Various protocols can be used to access and maintain the core-network-related databases through the interface, including a Mobile Application Part (MAP) protocol, a Diameter or Radius protocol, a Lightweight Directory Access Protocol (LDAP) protocol, and other protocols that may be developed in the future. For example, the TWAG and the TWAP within the Wi-Fi networks 310 use a Diameter protocol connection to communicate with the M-CNR 100. The MSC within the circuit access networks 320 uses a MAP protocol connection to communicate with the M-CNR 100, while the Mobility Applications within the circuit access networks 320 and the IP access networks 330 use an LDAP protocol connection to communication with the M-CNR 100. The MME and the PDF within the IP access networks 330 may use any suitable protocol to communicate with the M-CNR 100, including protocols that may be developed in the future.

The S-CNR 200 has a direct communication with the M-CNR 100, such that the S-CNR 200 may obtain subscriber information from the M-CNR 100 without exposing the M-CNR 100 to threats from third party application services providers. The S-CNR 200 includes service-related databases and is organized logically, e.g., according to services. The S-CNR 200 includes third party application repositories 210, which may include repositories for third party applications, such as Apple VZ Navigator®, Facebook®, Twitter®, etc. The third party application repositories 210 include subscriber information stored in both a standardized format and in a format tailored for each specific service provided by one or more third party application service providers. The S-CNR 200 also includes a repository for storing subscriber data in a standardized format, such as an enumerated format (ENUM) repository 220.

According to an illustrative embodiment, the S-CNR 200 also includes applications for performing various functions, which may be implemented in a manner described below with reference to FIG. 2. Such applications may include a Smart Profile Adaption Engine (SPAE) 230, along with a caching function 250 and a dynamic policy and security (DP&S) function 260 included within a front layer (FL) management layer 240.

The SPAE 230 enables dynamic profiling by propagating predefined parameters set for a given service, such as Facebook®, Twitter®, and other social network enabled services, to other services. A subscriber and a subscriber's equipment may run multiple services simultaneously, and these services have to maintain and change certain parameters as the parameters change with actions taken by the subscriber. For example, if the subscriber and the subscriber equipment move to a new location, the location parameter needs to change for the various services supported by the subscriber equipment that use the location parameter. The SPAE 230 enables changes made to a parameter for one service, such as Facebook®, to be propagated to other services that use the same parameter, e.g., Twitter® and other social network enabled services.

The caching function 250 causes subscriber information that is read from the M-CNR 100 to be retrieved and temporarily stored within the third party application repositories 210. As such, access to the M-CNR 100 is limited to a single interface, and traffic between the M-CNR 100 and the S-CNR 200 is minimized. As changes are made to the subscriber information stored within the third party application repositories 210, e.g., by third party application service providers, the caching function 250 causes the changes to be stored and numbered, such that there are various versions of the subscriber information, each numbered according to a change that has occurred since the subscriber information was obtained from the M-CNR 100. When modifications to the subscriber information are complete, the caching function 250 enables the latest version of the subscriber information to be sent from the S-CNR 200 to the M-CNR 100, such that the subscriber information in the M-CNR 100 reflects the most up-to-date information regarding third party application services.

In addition to accessing the subscriber information from the M-CNR 100 and keeping track of changes to the subscriber information, the caching function 250 enables consolidated network repository information obtained from another network, e.g., a network acquired by a provider of the main network using the M-CNR 100, to be temporarily stored. In this way, subscribers to the acquired network may immediately use the services of the main network, without waiting for the consolidated network repository information obtained from the other network to be integrated within the M-CNR 100.

The DP&S function 260 monitors and polices changes to the subscriber information that is imported into the S-CNR 200 from the M-CNR 100. Once a subscriber profile is stored in the third party application repositories 210, all parties who have access to the S-CNR 200 are able to read and change the subscriber profile parameters according to policies and limitations set for each of the parties. Once the changes are completed, the DP&S function 260 confirms that the changes are consistent with the policies set by the S-CNR 200. The subscriber information may be written back to the M-CNR 100 using the caching function 250. The DP&S function 260 can adapt to any service defined policy and security requirements. Monitoring and policing by the DP&S function 260 can be different for each subscriber and can be based on the behavior of the subscriber and changes that are being done to a subscriber profile by the subscriber or the services that are being offered. The DP&S function 260 allows policies and security rules to be dynamically changed to accommodate changes in services provided by third party application service providers.

The S-CNR 200 includes one or more interfaces to third party application service providers via a Service Execution Runtime Framework (SERF) 340, a Session Internet Protocol (SIP) Core network 350, and Operational Support Systems/Business Support Systems (OSS/BSS) 360.

The SERF 340 includes enablers, e.g., a Cisco Configuration Professional (CCP) gateway and an Internet Protocol Short Message Gateway (IP-SM-GW), Common Architecture for Real-Time Services (CARTS) applications, and service brokering to enable third party application service providers to provide web-based and Session Internet Protocol (SIP) based services, such as messaging, conferencing, social networking, etc.

The SIP Core 350 includes network components, such as an Interrogating Call Session Control Function (I-CSCF) and a Serving CSCF (S-CSCF), that control IP multimedia communication sessions, such as voice over Internet Protocol (IP) sessions.

The OSS/BSS 360 includes software applications that are used by operations, customer care, and other functional groups to manage business operations.

The S-CNR 200 communicates with the SERF 340 using MAP, LDAP, and Diameter or Radius protocol connections. The S-CNR 200 communicates with the SIP Core network 350 using a Diameter protocol. The S-CNR 200 communicates with the OSS/BSS 360 using any suitable protocol, including a protocol that may be developed in the future.

The S-CNR 200 includes open APIs to receive and respond to requests for subscriber information from third party application service providers. The S-CNR 200 responds to requests for subscriber information received from the third party application service providers received, e.g., from the SERF 340, the SIP Core 350, and/or the OSS/BSS 360, to be fulfilled using subscriber information stored in the third party application repositories 210 without providing the third party application service providers with access to the M-CNR 100. The subscriber information stored in the third party application repositories 210 mirrors the subscriber information that is stored in the M-CNR 100. If the requested subscriber information is not available in the third party application repository 210, the subscriber information is obtained from the M-CNR 100 using the caching function 250, as described above.

According to an illustrative embodiment, the S-CNR 200 enables the third party application service providers to access the subscriber information within the third party application repository 210 to add, delete, or modify the subscriber information without jeopardizing the integrity of the data stored within the M-CNR 100 which is used for facilitating operation of the core network. Each dataset within the third party application repository 210 can be associated with an access rule and/or a third party application provider identity, and each data item can be designated as readable and/or writeable.

According to an illustrative embodiment, the S-CNR 200 also enables service parameters associated with subscriber information to be changed depending on service changes, such as access domain changes, e.g., moving from a TDM based network to an IP based network. The S-CNR 200 closes the gap between the M-CNR 100 and third party application service providers in terms of how services behave and/or are delivered in different circumstances.

Figure 2:
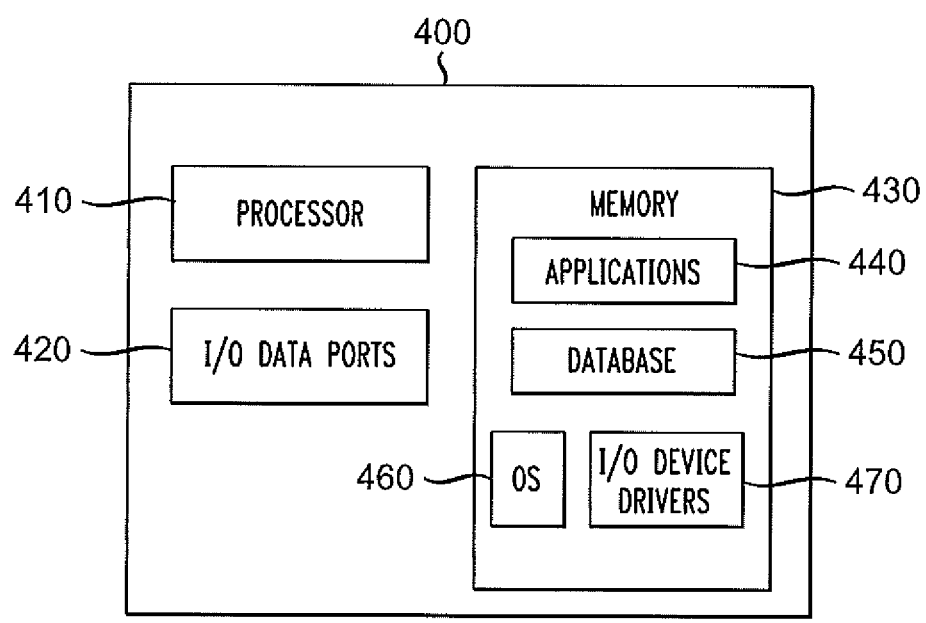
FIG. 2 illustrates a computing device which may be included in a shadow consolidated network repository according to an illustrative embodiment.

FIG. 2 is a block diagram of a computing device 400 which may be included within the S-CNR 200 shown in FIG. 1. Although no connections are shown between the components illustrated in FIG. 2, those skilled in the art will appreciate that the components can interact with each other via any suitable connections to carry out device functions.

It should be understood that FIG. 2 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software in addition to, or instead of, computer-readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the components shown in FIG. 2, excluding propagating signals.

According to an illustrative embodiment, the computing device 400 may be implemented in any suitable computing device having connections to the SERF 340, the SIP Core 350, the OSS/BSS 360 and the M-CNR 100 via any suitable network connections.

Referring to FIG. 2, the computing device 400 includes a processor 410 that receives a request for subscriber information from one or more third party application service providers. The request is received via the I/O data ports 420. The processor 410 determines whether the requested subscriber information is stored within the third party application repository 210. If the subscriber information is not stored within the third party application repository 210, the subscriber information is retrieved from the appropriate database in the M-CNR 100, e.g., the MIND 110, the HSS (IMS) 130, and the HSS (CS/PS) 140, via the I/O data ports 420. The processor 410 provides the third party application service providers with access to the stored subscriber information via the I/O data ports 420.

The I/O data ports 420 can be implemented with, e.g., an interface including an antenna or other suitable type of transceiver through which data and signals may be transmitted and received wired and/or wirelessly.

The processor 410 communicates with the memory 430 via, e.g., an address/data bus (not shown).

The processor 410 can be any commercially available or custom microprocessor. Additionally, although illustrated and described as one processor, the processor 410 could be implemented with multiple processors, which could include distributed processors or parallel processors in a single machine or multiple machines. Further, it should be appreciated that the processor can be used in supporting a virtual processing environment. Also, the processor could-include a state machine, application specific integrated circuit (ASIC), programmable gate array (PGA) including a Field PGA, or a state machine.

The memory 430 is representative of the overall hierarchy of memory devices containing the software and data used to implement the functionality of the device 400. The memory 430 can include, but is not limited to the following types of devices: processor registers, processor cache, RAM, ROM, PROM, EPROM, EEPROM, flash memory, SRAMD, DRAM, other volatile memory forms, and non-volatile, semi-permanent or permanent memory types; for example, tape-based media, optical media, solid state media, hard disks, combinations thereof, and the like, excluding propagating signals.

As shown in FIG. 2, the memory 430 may include several categories of software and data used in the device 400, including applications 440, a database 450, an operating system (OS) 460, and input/output (I/O) device drivers 470. The I/O device drivers 470 may include various routines accessed through at least one of the OS 460 by the applications 440 to communicate with devices and certain memory components.

The applications 440 can be stored in the memory 430 and/or in a firmware (not shown) as executable instructions, and can be executed by the processor 410 to perform operations. When the processor 410 executes instructions to perform "operations," this could include the processor performing the operations directly and/or facilitating, directing, or cooperating with another device or component to perform the operations.

The applications 440 include various programs that implement the various features of the device 400 for the S-CNR 200. For example, the applications 440 may include open APIs and applications for receiving requests for subscriber information, determining whether the subscriber information is stored in the third party application repository 210, retrieving the subscriber information from the M-CNR 100 when needed, storing the subscriber information within the third party application repository 210, providing access to the stored subscriber information to third party application service providers, modifying the subscriber information, and sending modified subscriber information to the M-CNR 100 for storage as described above. In addition, the applications 440 may include applications for performing a caching function 250, an SPAE 230 function, and a DP&S function 260, as described above.

The database 450 represents the static and dynamic data used by the applications 440, the OS 460, the I/O device drivers 470 and other software programs that may reside in the memory 430. The database 450 may be used to store, e.g., as the third party application repository to store subscriber information. The database 450 may also store rules for enabling and restricting access of subscriber information to various third party application service providers.

While the memory 430 is illustrated as residing proximate the processor 410, it should be understood that at least a portion of the memory 430 can be a remotely accessed storage system, including, for example, another server in communication with the processor 410 via, e.g., the Internet, a remote hard disk drive, a removable storage medium, combinations thereof, and the like. Thus, any of the data, applications, and/or software described above can be stored within the memory 430 and/or accessed via network connections to other data processing systems (not shown) that may include a local area network (LAN), a metropolitan area network (MAN), or a wide area network (WAN), for example.

Figure 3:
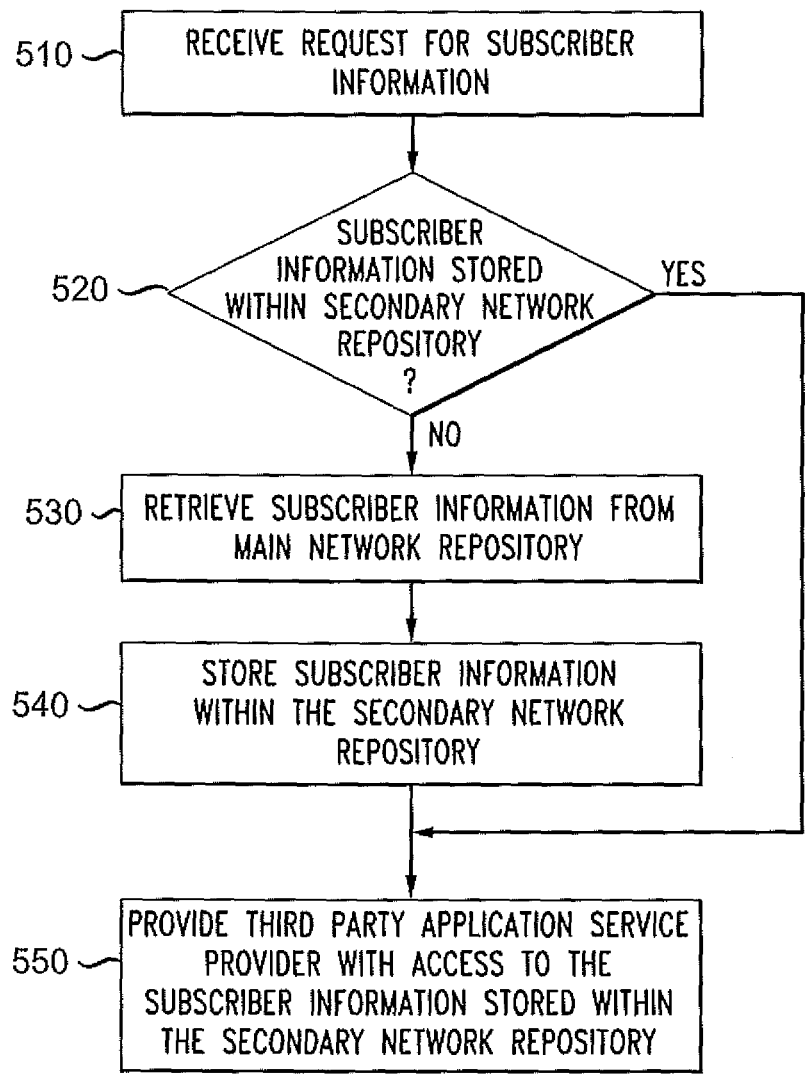
FIG. 3 illustrates a method for providing third party application service providers with access to subscriber information according to an illustrative embodiment.

FIG. 3 illustrates a method for providing third party application service providers with access to subscriber information via a S-CNR 200 according to an illustrative embodiment. The method begins at step 510 at which a request for subscriber information associated with a subscriber is received from a third party application service provider at the S-CNR 200 via the SERF 340, the SIP Core 350 and/or the OSS/BSS 360 and an open API associated with the S-CNR 200. At step 520, a determination is made whether requested subscriber information is stored within the third party application repository 210 of the S-CNR 200. This determination may be made by a processor, such as the processor 410 shown in FIG. 2. If the requested subscriber information is determined not to be stored within the the third party application repository 210 within the S-CNR 200, the requested subscriber information is retrieved from the M-CNR 100 at step 530 and stored within the third party application repository 210 within the S-CNR 200 at step 540. From step 540 and/or a positive determination at step 520 that the requested subscriber information is stored within the third party application repository 210, the method moves to step 550. At step 550, the S-CNR 200 provides the third party application service provider that sent the request for the subscriber information with access to the requested subscriber information stored within the third party application repository 210 of the S-CNR 200.

The law does not require and it is economically prohibitive to illustrate and teach every possible embodiment of the present claims. Hence, the above-described embodiments are merely illustrations of implementations set forth for a clear understanding of the claimed subject matter. Variations, modifications, and combinations may be made to the above-described embodiments without departing from the scope of the claims. All such variations, modifications, and combinations are included herein by the scope of this disclosure and the following claims.

What is claimed is:

1. A system comprising:
a shadow consolidated network repository comprising a first third party application repository associated with a first third party application service provider and further comprising a second third party application repository associated with a second third party application service provider, wherein the first third party application service provider provides a first service to a subscriber served by a communication network and the second third party application service provider provides a second service to the subscriber that is different from the first service provided to the subscriber by the first third party application service provider, wherein the first third party application repository of the shadow consolidated network repository stores subscriber information associated with the subscriber in a standardized format and in a format tailored for the first third party application service provider and the second third party application repository of the shadow consolidated network repository stores the subscriber information associated with the subscriber in the standardized format and in a format tailored for the second third party application service provider, wherein the subscriber information associated with the subscriber stored in the shadow consolidated network repository is obtained by the shadow consolidated network repository from network subscriber information stored within a main consolidated network repository that is distinct from the shadow consolidated network repository, wherein the network subscriber information stored within the main consolidated network repository is associated with the subscriber and is used to operate the communication network, and wherein the shadow consolidated network repository maintains the subscriber information associated with the subscriber across both the first third party application repository and the second third party application repository;
a processor; and
a memory that stores instructions that, when executed by the processor, cause the processor to perform operations comprising
receiving, from the first third party application service provider, a request for at least a portion of the subscriber information associated with the subscriber,
in response to receiving the request, providing the first third party application service provider with access to the subscriber information associated with the subscriber stored within the shadow consolidated network repository without providing the first third party application service provider with access to the main consolidated network repository,
in response to a first change in the first service provided by the first third party application service provider, modifying a parameter of the subscriber information stored within the first third party application repository of the shadow consolidated network repository and modifying a parameter of the subscriber information stored within the second third party application repository of the shadow consolidated network repository that is common to the parameter of the subscriber information stored within the first third party application repository of the shadow consolidated network repository to generate a first changed version of the parameter of the subscriber information,
in response to a second change in the first service provided by the first third party application service provider, modifying the parameter of the subscriber information stored within the first third party application repository of the shadow consolidated network repository and modifying the parameter of the subscriber information stored within the second third party application repository of the shadow consolidated network repository that is common to the parameter of the subscriber information stored within the first third party application repository of the shadow consolidated network repository to generate a second changed version of the parameter of the subscriber information,
numbering, in accordance with a caching function, the first changed version of the parameter of the subscriber information according to the first change and the second changed version of the parameter of the subscriber information according to the second change,
determining, in accordance with the caching function and based on the numbering of the first changed version of the parameter of the subscriber information and the numbering of the second changed version of the parameter of the subscriber information, that the second changed version of the parameter of the subscriber information is a latest version of the parameter of the subscriber information, and sending, in accordance with the caching function, the latest version of the parameter of the subscriber information from the shadow consolidated network repository to the main consolidated network repository, wherein the network subscriber information stored within the main consolidated network repository is only modifiable by the shadow consolidated network repository according to the caching function.

2. The system of claim 1, further comprising application programming interfaces for facilitating communication with the first third party application service provider and the second third party application service provider.

3. The system of claim 1, wherein the operations further comprise:

in response to receiving the request, determining whether at least the portion of the subscriber information associated with the subscriber is stored within the shadow consolidated network repository; and responsive to determining that at least the portion of the subscriber information associated with the subscriber is not stored within the shadow consolidated network repository, retrieving at least the portion of the subscriber information associated with the subscriber from the main consolidated network repository, and storing at least the portion of the subscriber information associated with the subscriber and retrieved from the main consolidated network repository within the shadow consolidated network repository.

4. The system of claim 1, wherein the latest version of the parameter of the subscriber information is sent to the main consolidated network repository once modifications to the parameter of the subscriber information are complete.

5. The system of claim 1, wherein the operations further comprise providing the second third party application service provider with access to the subscriber information stored within the shadow consolidated network repository without providing the second third party application service provider with access to the main consolidated network repository.

6. A method comprising:

receiving, by a processor of a system, from a first third party application service provider, a request for at least a portion of subscriber information associated with a subscriber served by a communication network, wherein the system comprises a shadow consolidated network repository comprising a first third party application repository associated with the first third party application service provider and further comprising a second third party application repository associated with a second third party application service provider, wherein the first third party application service provider provides a first service to the subscriber and the second third party application service provider provides a second service to the subscriber that is different from the first service provided to the subscriber by the first third party application service provider, wherein the first third party application repository of the shadow consolidated network repository stores the subscriber information associated with the subscriber in a standardized format and in a format tailored for the first third party application service provider and the second third party application repository of the shadow consolidated network repository stores the subscriber information associated with the subscriber in the standardized format and in a format tailored for the second third party application service provider, wherein the subscriber information associated with the subscriber stored in the shadow consolidated network repository is obtained by the shadow consolidated network repository from network subscriber information stored within a main consolidated network repository that is distinct from the shadow consolidated network repository, wherein the network subscriber information stored within the main consolidated network repository is associated with the subscriber and is used to operate the communication network, and wherein the shadow consolidated network repository maintains the subscriber information associated with the subscriber across both the first third party application repository and the second third party application repository;

in response to receiving the request, providing, by the processor, the first third party application service provider with access to the subscriber information associated with the subscriber stored within the shadow consolidated network repository without providing the first third party application service provider with access to the main consolidated network repository;

in response to a first change in the first service provided by the first third party application service provider, modifying, by the processor, a parameter of the subscriber information stored within the first third party application repository of the shadow consolidated network repository and modifying a parameter of the subscriber information stored within the second third party application repository of the shadow consolidated network repository that is common to the parameter of the subscriber information stored within the first third party application repository of the shadow consolidated network repository to generate a first changed version of the parameter of the subscriber information;

in response to a second change in the first service provided by the first third party application service provider, modifying, by the processor, the parameter of the subscriber information stored within the first third party application repository of the shadow consolidated network repository and modifying the parameter of the subscriber information stored within the second third party application repository of the shadow consolidated network repository that is common to the parameter of the subscriber information stored within the first third party application repository of the shadow consolidated network repository to generate a second changed version of the parameter of the subscriber information;

numbering, by the processor in accordance with a caching function, the first changed version of the parameter of the subscriber information according to the first change and the second changed version of the parameter of the subscriber information according to the second change;

determining, by the processor in accordance with the caching function, based on the numbering of the first changed version of the parameter of the subscriber information and the numbering of the second changed version of the parameter of the subscriber information, that the second changed version of the parameter of the subscriber information is a latest version of the parameter of the subscriber information; and sending, by the processor in accordance with the caching function, the latest version of the parameter of the subscriber information from the shadow consolidated network repository to the main consolidated network repository, wherein the network subscriber information stored within the main consolidated network repository is only modifiable by the shadow consolidated network repository according to the caching function.

7. The method of claim 6, further comprising:
in response to receiving the request, determining, by the processor, whether at least the portion of the subscriber information associated with the subscriber is stored within the shadow consolidated network repository;
responsive to determining that at least the portion of the subscriber information associated with the subscriber is not stored within the shadow consolidated network repository,
 retrieving, by the processor, at least the portion of the subscriber information associated with the subscriber from the main consolidated network repository, and
 storing at least the portion of the subscriber information associated with the subscriber and retrieved from the main consolidated network repository within the shadow consolidated network repository.

8. The method of claim 6, wherein the latest version of the parameter of the subscriber information is sent to the main consolidated network repository once modifications to the parameter of the subscriber information are complete.

9. The method of claim 6, further comprising providing the second third party application service provider with access to the subscriber information stored within the shadow consolidated network repository without providing the second third party application service provider with access to the main consolidated network repository.

10. A computer-readable storage medium having instructions stored thereon that, when executed by a processor of a system, cause the processor to perform operations comprising:
 receiving, from a first third party application service provider, a request for at least a portion of subscriber information associated with a subscriber serviced by a communication network, wherein the system comprises a shadow consolidated network repository comprising a first third party application repository associated with the first third party application service provider and further comprising a second third party application repository associated with a second third party application service provider, wherein the first third party application service provider provides a first service to the subscriber and the second third party application service provider provides a second service to the subscriber that is different from the first service provided to the subscriber by the first third party application service provider, wherein the first third party application repository of the shadow consolidated network repository stores the subscriber information associated with the subscriber in a standardized format and in a format tailored for the first third party application service provider and the second third party application repository of the shadow consolidated network repository stores the subscriber information associated with the subscriber in the standardized format and in a format tailored for the second third party application service provider, wherein the subscriber information associated with the subscriber stored in the shadow consolidated network repository is obtained by the shadow consolidated network repository from network subscriber information stored within a main consolidated network repository that is distinct from the shadow consolidated network repository, wherein the network subscriber information is associated with the subscriber and is used to operate the communication network, and wherein the shadow consolidated network repository maintains the subscriber information associated with the subscriber across both the first third party application repository and the second third party application repository;
 in response to receiving the request, providing the first third party application service provider with access to the subscriber information associated with the subscriber stored within the shadow consolidated network repository without providing the first third party application service provider with access to the main consolidated network repository;
 in response to a first change in the first service provided by the first third party application service provider, modifying a parameter of the subscriber information stored within the first third party application repository of the shadow consolidated network repository and modifying a parameter of the subscriber information stored within the second third party application repository of the shadow consolidated network repository that is common to the parameter of the subscriber information stored within the first third party application repository of the shadow consolidated network repository to generate a first changed version of the parameter of the subscriber information;
 in response to a second change in the first service provided by the first third party application service provider, modifying the parameter of the subscriber information stored within the first third party application repository of the shadow consolidated network repository and modifying the parameter of the subscriber information stored within the second third party application repository of the shadow consolidated network repository that is common to the parameter of the subscriber information stored within the first third party application repository of the shadow consolidated network repository to generate a second changed version of the parameter of the subscriber information;
 numbering, in accordance with a caching function, the first changed version of the parameter of the subscriber information according to the first change and the second changed version of the parameter of the subscriber information according to the second change;
 determining, in accordance with the caching function and based on the numbering of the first changed version of the parameter of the subscriber information and the numbering of the second changed version of the parameter of the subscriber information, that the second changed version of the parameter of the subscriber information is a latest version of the parameter of the subscriber information; and
 sending, in accordance with the caching function, the latest version of the parameter of the subscriber information from the shadow consolidated network repository to the main consolidated network repository, wherein the network subscriber information stored within the main consolidated network repository is only modifiable by the shadow consolidated network repository according to the caching function.

11. The computer-readable storage medium of claim 10, wherein the operations further comprise:
 in response to receiving the request, determining whether at least the portion of the subscriber information associated with the subscriber is stored within the shadow consolidated network repository; and responsive to determining that at least the portion of the subscriber information associated with the subscriber is not stored within the shadow consolidated network repository, retrieving at least the portion of the subscriber information associated with the subscriber from the main consolidated network repository, and storing at least the portion of the subscriber information associated with the subscriber and retrieved from the main consolidated network repository within the shadow consolidated network repository.

12. The computer-readable storage medium of claim 10, wherein the latest version of the parameter of the subscriber information is sent to the main consolidated network repository once modifications to the parameter of the subscriber information are complete.

13. The computer-readable storage medium of claim 10, wherein the operations further comprise providing the second third party application service provider with access to the subscriber information stored within the shadow consolidated network repository without providing the second third party application service provider with access to the main consolidated network repository.

\* \* \* \* \*